March 18, 1958   J. P. WAITE   2,827,186
LOCKING APPARATUS FOR A TELESCOPIC BOOM
Filed Nov. 17, 1955
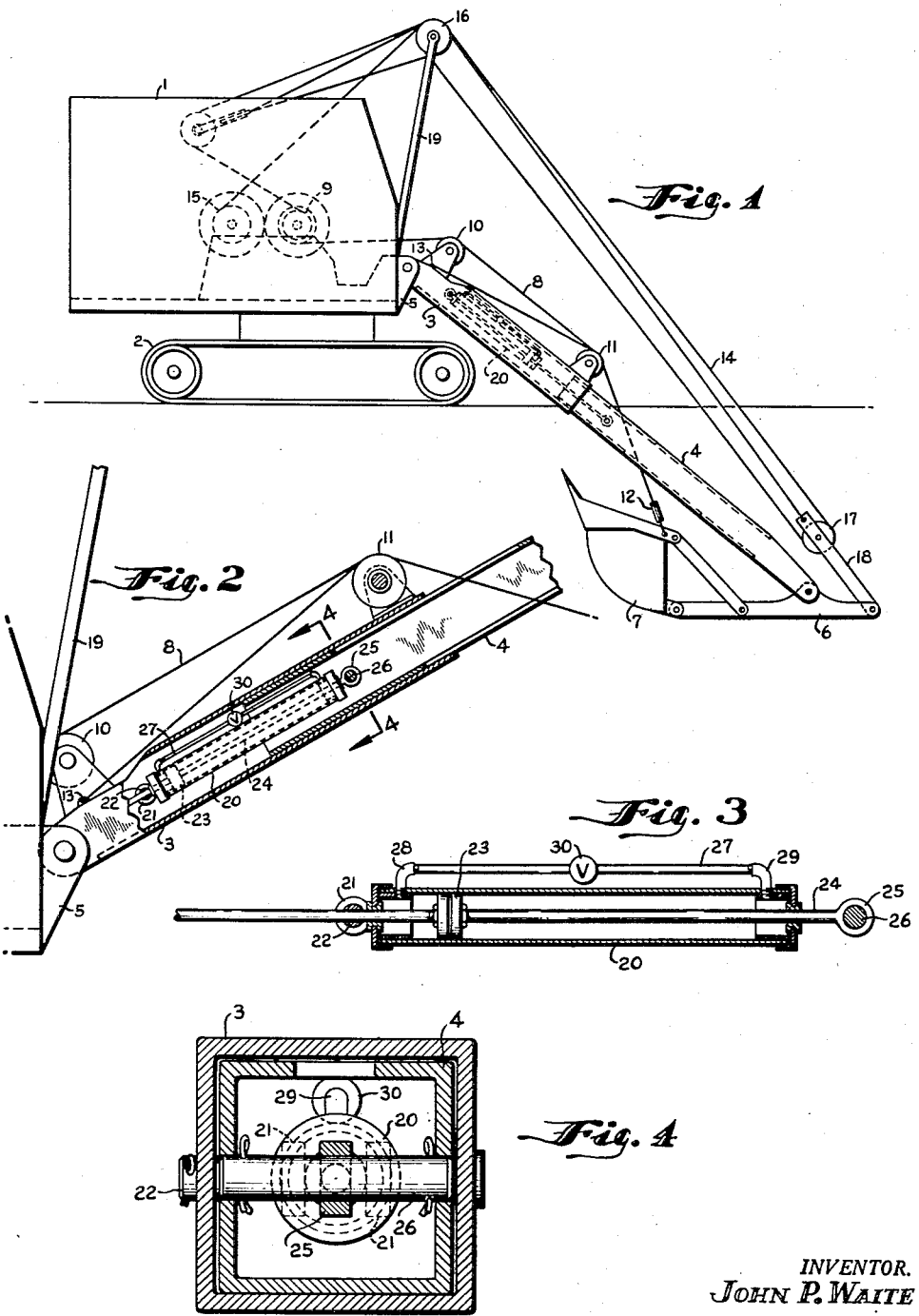
INVENTOR.
JOHN P. WAITE
BY Andrus & Sceales
Attorneys

United States Patent Office 2,827,186
Patented Mar. 18, 1958

2,827,186

LOCKING APPARATUS FOR A TELESCOPIC BOOM

John P. Waite, Milwaukee, Wis., assignor to J. P. Waite, Inc., Milwaukee, Wis., a corporation of Wisconsin Application November 17, 1955, Serial No. 547,435

4 Claims. (Cl. 214—141)

This invention relates to power operated construction apparatus, such as a back hoe, crane or the like, and more particularly to a power operated apparatus having a telescopic boom.

When using a back hoe it is often desirable to change the length of the boom in order to meet the requirements for a specific digging operation. It is convenient to have a boom that can be readily lengthened or shortened as desired, particularly when digging around obstructions such as trees, pipe, etc. Similarly, it is often desirable to have a variable length boom for a crane so that the length of the boom can be readily changed to meet the requirements of a given operation.

At present there are power operated telescopic booms which are lengthened or shortened through operation of a hydraulic system. Not only is a hydraulic system expensive due to the pumps, valves and other high pressure equipment that is required, but a hydraulic system is not readily adaptable to existing machines. For example, it is not feasible to drive the pump of a hydraulic system from the drum motor of an existing back hoe or crane due to the complicated speed reduction mechanism which would be required. Therefore, to install a hydraulic system for actuating a telescopic boom on an existing machine requires the addition of a separate power unit to operate the hydraulic system.

The present invention is directed to a simple and inexpensive apparatus for varying the length of a boom. The apparatus not only can be installed on new machinery but can be applied to existing machines without the need of a separate hydraulic system and without altering parts, with the exception of making the boom telescopic, or changing the operation of the machine.

According to the invention, the boom is composed of two telescopic members which are slidable with respect to each other to increase and decrease the length of the boom. A hydraulic cylinder is attached to one of the boom members and the working end of the piston rod carried by the cylinder is attached to the other of the boom members. A closed conduit connects the opposite ends of the cylinder and permits hydraulic fluid contained within the cylinder to pass freely from one end of the cylinder to the other as the piston moves within the cylinder in accordance with relative movement of the boom members. The boom members are locked in relation to each other to hold the boom at any desired length by a valve which is disposed in the conduit and is adapted to cut off the flow of fluid therethrough.

The boom is extended or retracted either by operation of the drag and hoist lines while holding the dipper in a fixed position or by elevating or lowering the boom and permitting gravity to slide the boom members in relation to one another. When the boom members are at the proper extended or contracted position to give the desired boom length, the valve is closed, thereby locking the boom members in this position and providing the boom with the desired length.

The present invention is of simple construction and does not require a separate hydraulic system and the accompanying valving and pumping members. In addition, the present apparatus may be quickly and easily operated, for the operator has merely one valve control to actuate in order to lock the boom at a desired length. There is no complicated control system such as that which usually accompanies a hydraulic system.

The present construction can be readily adapted for use with existing machines without alteration of parts or changing the operation of the machine. As no complicated hydraulic system is required and as high fluid pressures are not involved in the present apparatus, the maintenance problem is at a minimum.

The drawings illustrate the best mode presently contemplated of carrying out the present invention.

In the drawings:

Figure 1 is a diagrammatic side elevation of a back hoe embodying the present invention;

Fig. 2 is an enlarged fragmentary side elevation with parts broken away in section and showing the hydraulic system for locking the boom members in positions with relation to each other;

Fig. 3 is an enlarged sectional view of the hydraulic cylinder employed for locking the boom at a given length; and Fig. 4 is an enlarged transverse section taken along lines 4—4 of Fig. 2.

The drawings illustrate a power operated back hoe or drag shovel having a cab 1 which houses the drive mechanism and is rotatable on crawlers or treads 2.

A telescopic boom is secured to the cab and is composed on a pair of boom members 3 and 4 which are slidably interconnected to provide the boom with a variable length. The inner end of inner boom member 3 is pivotally connected to a pair of lugs 5 which extend upwardly from the front of cab 1. A dipper stick 6 is pivotally secured to the outer end of the outer boom member 4 and the dipper stick carries a dipper 7 which is adapted to penetrate and dig into the material to be excavated.

The dipper 7 and dipper stick 6 are pivoted about the boom to move the dipper in the digging and dumping strokes by a cable 8 which is secured to cable drum 9. Cable 8 passes over sheaves 10 and 11, which are rotatably secured to the upper surface of inner boom member 3, and sheave 12, which is secured to the forward edge of the dipper. The cable is dead-ended on the boom, as indicated by 13. With this sheaving arrangement the dipper 7 is drawn inwardly toward the machine as the cable 8 is retrieved and moves outwardly away from the machine as the cable 8 is let out.

The boom is raised and lowered by a conventional sheaving system in which a cable 14, secured to cable drum 15, passes over sheaves 16 and 17 and is dead-ended on arms 18. The arms 18 are pivotally attached to the upper end of dipper stick 6 and rotatably support the sheave 17. The sheave 16 is rotatably secured to the outer end of mast 19 which extends upwardly from the cab 1. By retrieving cable 14, sheave 17 is moved toward sheave 16 thereby pivoting the boom upwardly about the forward portion of the cab, while letting out cable 14 serves to pivot the boom downwardly with respect to the cab.

Each of the boom members 3 and 4 are provided with a generally box-shaped cross section with the outer member 4 having a lesser dimension than the inner member 3 so that the outer member is slidable within the inner member.

The length of the boom can be increased by retrieving drag cable 8 and slacking off on the hoist cable 14 while the dipper is maintained in a fixed position as by digging the dipper teeth into the ground. This action pulls the outer member 4 outwardly of the inner member 3 and thereby serves to increase the length of the boom.

To make the boom shorter, the hoist cable 14 is retrieved while again maintaining the dipper in a fixed position and slacking off on the drag cable 8. This action telescopes the outer member 4 into the inner member and thereby shortens the length of the boom.

Gravity can also be employed to shorten or lengthen the boom. To shorten the boom length, the boom is pivoted upwardly to a dumping position and the outer boom member 4 will then slide downwardly within the inner member. Conversely, by lowering the boom down into an excavation, the force of gravity will cause the outer boom member 4 to slide downwardly away from the inner member 3 and thereby increase the length of the boom.

Suitable guides and ways may be used with boom members 3 and 4, if desired, to facilitate the sliding movement of member 4 which respect to member 3.

To lock the outer boom member 4 with respect to boom member 3 and thereby secure the boom at any desired length, a hydraulic cylinder is disposed within the telescoped boom members and is adapted to contain a hydraulic fluid. The inner end of the cylinder 20 is provided with a pair of lugs 21 which receive a pin 22. The pin 22 is disposed through suitable aligned openings in the side walls of the boom member 3 and is locked therein by any conventional means. A piston 23 is slidably disposed within the cylinder 20 and carries a piston rod 24 which extends outwardly through suitable packings in both ends of the cylinder. The inner end portion of piston rod 23 is slidably disposed within a suitable opening in pin 22. As the inner end portion of rod 23, extending inwardly beyond the piston, is approximately equal to the length of the outer portion of the rod extending outwardly beyond the piston, the effective volume of the cylinder on either side of the piston, when the piston is at the center of the cylinder, is the same.

The outer or working end of rod 24 is enlarged, as indicated at 25, and receives a pin 26. The pin 26 is suitably secured within aligned openings in the side walls of the outer boom member 4 and serves to connect piston rod 24 to boom member 4.

With this construction, as the boom member 4 is extended or retracted, the piston 23 is moved correspondingly within the cylinder 20.

To provide a closed hydraulic system for the hydraulic fluid, a conduit 27 is connected between fittings 28 and 29 which are secured within openings in the opposite end portions of cylinder 20. The conduit 27 establishes communication between the opposite end portions of the cylinder, and as the boom member 4 is moved with respect to boom member 3, the piston 23 moves within the cylinder 20 to displace fluid from one end of the cylinder through conduit 27 to the opposite end of the cylinder.

For example, as the boom member 4 is moved outwardly with respect to boom member 3 to increase the length of the boom, the piston 23 is moved outwardly within the cylinder thereby forcing fluid from the outer end of cylinder 20 through conduit 27 to the inner end of the cylinder. When the boom length is shortened by boom member 4 moving inwardly, piston 23 moves inwardly within cylinder 20 to force fluid from the inner end of the cylinder through conduit 27 to the outer end thereof.

To cut off the flow of fluid within the closed hydraulic system and thereby lock the boom members 3 and 4 with respect to each other, a valve 30 is disposed in the conduit 27. Valve 30 may either be manually or automatically operated and serves to prevent the flow of fluid through the conduit 27 and thereby prevent relative movement of the boom members. It is contemplated that the valve 30 can be operated by the operator of the machine either by a flexible cable, electrically or by any other convenient means.

In operation of the present apparatus, the valve 30 is initially opened and the boom member 4 is extended or contracted with respect to boom member 3, in the manner set forth previously, to give the desired boom length. Valve 30 is then closed to lock the boom members against relative movement and hold the boom at the given length. If a change of boom length is subsequently desired, valve 30 is merely opened and the boom member 4 is again moved to obtain the desired length.

While the present description is directed to the cylinder 20 being attached to the inner boom member 3 and the piston rod 24 being attached to the outer boom member 4, it is contemplated that the cylinder can be connected to boom member 4 and the piston rod to boom member 3. Similarly, the cylinder and piston rod structure can be located outwardly of the boom members rather than within the same, as shown in the drawings.

The present invention provides a simple apparatus for varying the length of a telescopic boom and locking the boom at the desired length. The apparatus may readily be adapted for use with conventional back hoes, cranes or other apparatus having a boom which can be varied in length.

Various modes of carrying out the invention are contemplated as within the scope of the following claims particularly pointing out and distinctly claiming the subject matter which is regarded as the invention.

I claim:

1. In a power operated apparatus, a boom having a pair of telescopic boom members with said members being slidable with respect to each other to increase and decrease the length of the boom, a cylinder to contain hydraulic fluid and attached to one of said members, piston means freely slidable within said cylinder and connected to the other of said members, conducting means providing communication between opposite end portions of the cylinder with the fluid being free to flow from one end portion of the cylinder through said conducting means to the opposite end portion of the cylinder as said piston means moves within the cylinder, and valve means associated with said conducting means to cut off the flow of fluid therethrough and prevent relative movement of the boom members and thereby lock the boom at a given length.

2. In a power operated apparatus, a supporting structure, a boom pivotally attached to said supporting structure and including a pair of boom members freely slidable with respect to each other to increase and decrease the length of the boom, a closed hydraulic system consisting of a reservoir connected to one of said members and conduit means providing communication between opposite end portions of said reservoir, a hydraulic fluid disposed within said reservoir, a ram freely slidable within said reservoir and connected to the other of said boom members, separate means for moving said boom members with respect to each other to increase and decrease the length of the boom with said ram moving within said reservoir in accordance with relative movement of said boom members and displacing a quantity of fluid from one end portion of said reservoir through said conduit means to the other end portion of said reservoir, and valve means associated with said conduit means and having an open and closed position, the open position of said valve means permitting fluid to pass through said conduit means and thereby permit free relative movement of said boom members and the closed position of the valve closing off the flow of fluid through said conduit means to thereby lock the boom members with respect to each other and hold the boom at a given length.

3. In a power operated apparatus, a supporting structure, a boom including a first boom member pivotally connected to the supporting structure and a second boom member supported by said first member and movable in relation to first boom member to increase and decrease the length of a boom, a cylinder to contain hydraulic fluid and pivotally attached to one of said members, piston means freely slidable within said cylinder and pivotally connected to the other of said members, conduit means providing communication between opposite end portions of the cylinder, separate means for moving said boom members with respect to each other to increase and decrease the length of the boom with said piston means moving within said cylinder in accordance with relative movement of said boom members and displacing a quantity of fluid from one end portion of said cylinder through said conduit means to the other end portion of said cylinder, and a valve member disposed in said conduit means and having two operative positions, the first of said positions permitting fluid to pass through said conduit means and thereby permit free relative movement of said boom members and the second of said positions closing off the flow of fluid through said conduit means to thereby lock the boom members with respect to each other and hold the boom at a given length.

4. In a power operated apparatus, a supporting structure, a boom including an inner member pivotally connected to the supporting structure and an outer member supported by said inner member, both of said members having a generally box-shaped cross section and said outer member being freely slidable with respect to the inner member to increase and decrease the length of the boom, a cylinder adapted to contain a hydraulic fluid disposed within one of said members and connected thereto, piston means freely slidable within said cylinder and connected to the other of said members, fluid conducting means providing communication between opposite end portions of the cylinder with the fluid being free to flow from one end portion of the cylinder through said fluid conducting means to the opposite end portion of the cylinder as said piston means moves within the cylinder, and valve means associated with said conducting means to cut off the flow of fluid therethrough and prevent relative movement of the boom members and thereby lock the boom at a given length.

References Cited in the file of this patent
UNITED STATES PATENTS 2,196,649    Waite  ------------------- Apr. 9, 1940